United States Patent

Ogura et al.

(10) Patent No.: US 9,401,808 B2
(45) Date of Patent: Jul. 26, 2016

(54) MEASURING DEVICE, INFORMATION PROCESSOR, KEY MANAGEMENT DEVICE, AND CONSUMPTION CALCULATING SYSTEM

(71) Applicant: KABUSHIKI KAISHA TOSHIBA, Minato-ku (JP)

(72) Inventors: Naoki Ogura, Kawasaki (JP); Shinji Yamanaka, Tokyo (JP); Yoshikazu Hanatani, Kawasaki (JP); Toshinari Takahashi, Tokyo (JP); Yuichi Komano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/177,572

(22) Filed: Feb. 11, 2014

(65) Prior Publication Data

US 2014/0298042 A1    Oct. 2, 2014

(30) Foreign Application Priority Data

Mar. 29, 2013    (JP) .................................. 2013-071529

(51) Int. Cl.
*G06F 21/62* (2013.01)
*H04L 9/08* (2006.01)
*G01D 4/00* (2006.01)

(52) U.S. Cl.
CPC .............. *H04L 9/0894* (2013.01); *G01D 4/002* (2013.01); *G06F 21/6209* (2013.01); *H04L 9/0891* (2013.01)

(58) Field of Classification Search
CPC ........................... G01D 4/002; G06F 21/6209
See application file for complete search history.

(56) References Cited

U.S. PATENT DOCUMENTS 6,782,103 B1 *   8/2004  Arthan et al. .................. 380/278
2004/0034603 A1 * 2/2004  Hastings .................. G06F 21/34
                                                            705/63

(Continued)

FOREIGN PATENT DOCUMENTS

JP    2012-58345    3/2012
JP    2012-58852    3/2012

OTHER PUBLICATIONS

Lu et al., "EPPA: An Efficient and Privacy-Preserving Aggregation Scheme for Secure Smart Grid Communications", Sep. 2012, pp. 1621-1632.*

(Continued)

*Primary Examiner* — Shawnchoy Rahman
*Assistant Examiner* — Thaddeus Plecha
(74) *Attorney, Agent, or Firm* — Oblon, McClelland, Maier & Neustadt, L.L.P.

(57) ABSTRACT

A measuring device has a consumption measurer to measure a consumption of at least one target equipment at every unit time within a predetermined measurement area, a consumption storage to store the measured consumption, a secret key storage to store a secret key shared with a key management device, an encryption key updater to update an encryption key at every predetermined period based on the secret key and time information, an encryption key storage to store the encryption key, an encryptor to generate encrypted data by encrypting the consumption using the encryption key stored in the encryption key storage, an encrypted data storage to store the encrypted data, and a communication controller to control transmission of the encrypted data, which is stored in the encrypted data storage, to a total consumption detecting device.

9 Claims, 17 Drawing Sheets

(56) References Cited

U.S. PATENT DOCUMENTS

| | | | |
|---|---|---|---|
| 2004/0073786 A1* | 4/2004 | O'Neill et al. | 713/155 |
| 2004/0105542 A1* | 6/2004 | Takase et al. | 380/44 |
| 2007/0266426 A1* | 11/2007 | Iyengar et al. | 726/5 |
| 2010/0100253 A1* | 4/2010 | Fausak et al. | 700/295 |
| 2010/0188255 A1* | 7/2010 | Cornwall | 340/870.02 |
| 2010/0208898 A1* | 8/2010 | Acar et al. | 380/280 |
| 2012/0065789 A1* | 3/2012 | Scelzi et al. | 700/291 |
| 2012/0297198 A1* | 11/2012 | Danezis et al. | 713/179 |
| 2012/0314868 A1* | 12/2012 | Bernheim | H04L 9/0827 380/279 |
| 2013/0124850 A1* | 5/2013 | Gomez Marmol et al. | 713/150 |
| 2013/0314249 A1* | 11/2013 | Le Buhan et al. | 340/870.02 |
| 2014/0211939 A1* | 7/2014 | Holmdahl | G06Q 20/145 380/44 |
| 2014/0229734 A1 | 8/2014 | Yamanaka et al. | |
| 2014/0230007 A1* | 8/2014 | Roth et al. | 726/1 |

OTHER PUBLICATIONS

U.S. Appl. No. 14/133,825, filed Dec. 19, 2013, Shinji Yamanaka, et al.

* cited by examiner

FUNCTIONAL STRUCTURE OF EMS

PROCESS PERFORMED BY SM TO GENERATE UPDATE TIME
AT THE TIME OF INITIAL STARTUP

PROCESS PERFORMED BY KEY MANAGEMENT SERVER
TO GENERATE UPDATE TIME AT THE TIME OF INITIAL STARTUP

MEASURING DEVICE, INFORMATION PROCESSOR, KEY MANAGEMENT DEVICE, AND CONSUMPTION CALCULATING SYSTEM

CROSS REFERENCE TO RELATED APPLICATIONS

This application is based upon and claims the benefit of priority from the prior Japanese Patent Application No. 2013-71529, filed on Mar. 29, 2013, the entire contents of which are incorporated herein by reference.

FIELD

Embodiments of the present invention relate to a measuring device for measuring a consumption of a target, an information processor, a key management device, and to a consumption calculating system.

BACKGROUND

In a next-generation power network called smart grid, a Smart Meter (hereinafter referred to as SM), which is an electricity meter for measuring power consumption of electrical equipment, is installed in each area (e.g. home) on which power consumption should be measured. The SM communicates with a Meter Data Management System (hereinafter referred to as MDMS), which is a data management device, through the power network. The MDMS collects power consumptions per unit time from the SMs installed in the respective homes etc. The power consumptions per unit time collected by the MDMS are utilized by e.g. an Energy Management System (hereinafter referred to as EMS) connected to the power network. Based on the total power consumption about a plurality of homes etc. obtained from the MDMS, the EMS controls power by requesting each home in a targeted management region to restrain power consumption, or by charging/discharging a storage battery connected to the power network. The MDMS can provide the power consumption not only to the EMS but also to a system (hereinafter collectively referred to as application server) utilizing the total power consumptions collected from the SMs. Accordingly, the MDMS retains the power consumptions collected from the SMs in order to calculate the total power consumption to be utilized by the application server later.

However, the MDMS directly retaining the power consumption measured by the SMs can be illegally obtained by an administrator of the MDMS or a user illegally entered the MDMS to guess the activities in each home, which leads to invasion of privacy. Therefore, it is under consideration that the MDMS retains information of the power consumption in a state of concealing the actual power consumption measured by the SMs and the application server calculates the total amount of the power consumption, thereby protecting a privacy. In order to let the MDMS retain the power consumptions in the state of concealing the actual power consumption, it is effective to encrypt the power consumption by each SM. In this case, a configuration which does not put much load on the SM and MDMS is required.

DETAILED DESCRIPTION

Figure 1:
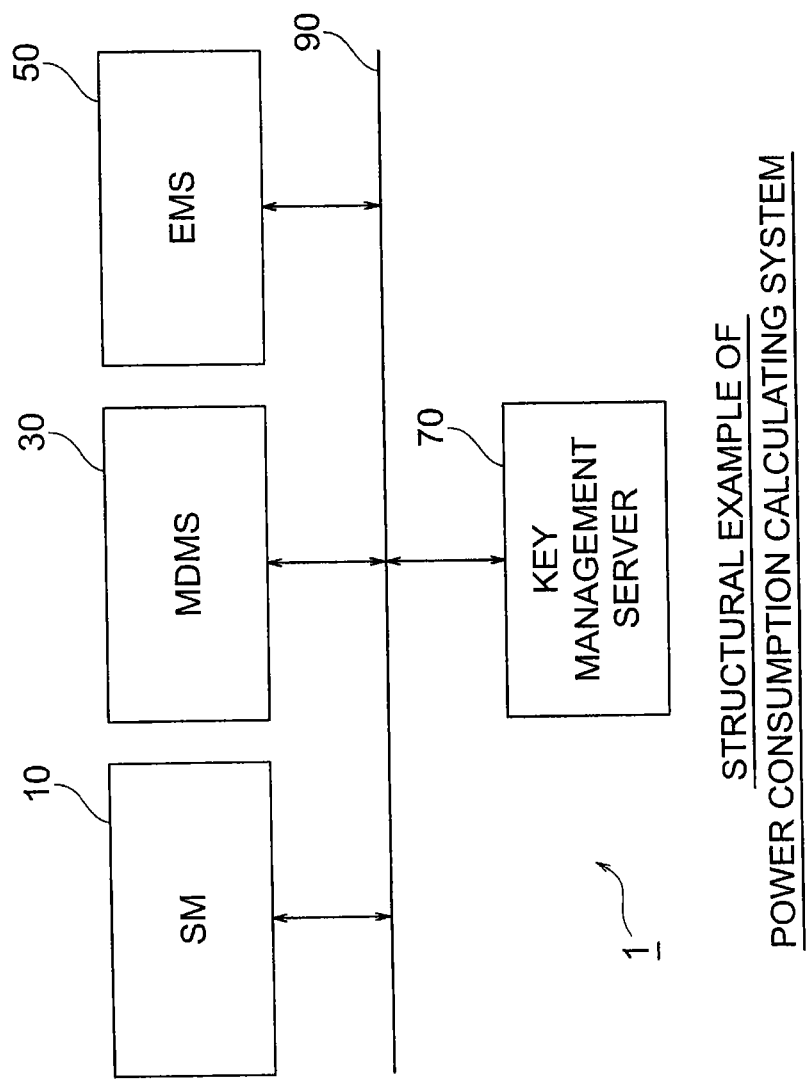
FIG. 1 is a block diagram showing a structural example of a power consumption calculating system according to an embodiment.

A measuring device has a consumption measurer to measure a consumption of at least one target equipment at every unit time within a predetermined measurement area, a consumption storage to store the measured consumption, a secret key storage to store a secret key shared with a key management device, an encryption key updater to update an encryption key at every predetermined period based on the secret key and time information, an encryption key storage to store the encryption key, an encryptor to generate encrypted data by encrypting the consumption using the encryption key stored in the encryption key storage, an encrypted data storage to store the encrypted data, and a communication controller to control transmission of the encrypted data, which is stored in the encrypted data storage, to a total consumption detecting device.

First, a consumption calculating system according to an embodiment will be schematically explained. The consumption calculating system according to the embodiment has an SM (measuring device) installed in each of a plurality of measurement areas, an MDMS (total consumption detecting device), an EMS (information processor), and a key management server (key management device). The explanation to be given below is based on an assumption that the consumption calculating system according to the embodiment mainly handles power consumption as an example.

The SM measures a consumption (e.g. power consumption) of at least one target equipment (e.g. electrical equipment) per unit time in a predetermined measurement area, encrypts the measured power consumption per unit time with an encryption key generated using a secret key of its own, and transmits the encrypted text, i.e. encrypted data (first value), to the MDMS. Here, the target equipment means an equipment which spends the consumption and the consumption of which is measured by the SM. The secret key used by the SM to encrypt the power consumption is shared with the key management server.

The MDMS receives and stores the encrypted data transmitted from each of a plurality of SMs. At this time, the encryption key used by each SM to encrypt the power consumption is concealed from the MDMS. Accordingly, the power consumption per unit time measured by each SM cannot be decrypted by the MDMS, which leads to protection of privacy.

Further, the MDMS totalizes a plurality of encrypted data items of each group consisting of SMs to be managed by the EMS, and generates encrypted total power consumption data (second value). Then, the MDMS transmits the encrypted total power consumption data to the EMS.

The EMS receives the encrypted total power consumption data transmitted from the MDMS, decrypts this encrypted total power consumption data with a decryption key of its own, and generates a total power consumption (third value), which is a value obtained by totalizing a plurality of power consumptions. As stated above, the EMS generates the total power consumption by acquiring, from the MDMS, the encrypted total power consumption data obtained by totalizing the power consumptions of the respective SMs forming a group in a predetermined targeted management region. Then, the EMS carries out applications using the generated total power consumption to request restriction of power consumption and to control regional power consumption. The decryption key used by the EMS to decrypt the encrypted total power consumption data is received from the key management server at regular time intervals.

The key management server updates the decryption key at regular time intervals for each SM group to be managed by the EMS, and transmits the generated decryption key to the EMS. This decryption key is generated using time information and the secret key (encryption key) used by each SM to encrypt the power consumption. As stated above, the decryption key is used to decrypt the encrypted total power consumption data that the EMS received from the MDMS.

As stated above, according to the power consumption calculating system in the present embodiment, the MDMS does not store the power consumption itself, but stores the encrypted data obtained by encrypting the power consumption with the secret key of the SM. Further, the totalizing process performed by the MDMS is conducted in a state of concealing the original power consumption. Therefore, even when some information is taken out from the MDMS by an administrator of the MDMS or by a user illegally entered the MDMS, the power consumption itself cannot be leaked, which leads to protection of privacy. Further, the SM transmits, to the MDMS, the encrypted data obtained by encrypting the power consumption with the secret key of the SM, and the MDMS transmits, to the EM, the encrypted total power consumption data which can be decrypted with the decryption key received from the key management server. Therefore, even when the communication between the SM and the MDMS or the communication between the MDMS and the EMS is attacked, neither the power consumption nor the total power consumption can be leaked, which leads to protection of privacy. Note that the communication between the key management server and the EMS server should be protected by e.g. performing another encryption process to prevent the decryption key from being leaked.

As a method to make it possible for the EMS to calculate the total power consumption while letting the MDMS retain the power consumptions in the state of concealing the actual power consumption, it is assumed that the MDMS and the key management server cooperatively convert the power consumption encrypted by the SM into a power consumption which can be decrypted by the EMS. However, in this method, communication between the MDMS and the key management server occurs each time the MDMS performs the conversion, which increases a load and requires the key management server to transmit a large volume of information. On the other hand, in the present embodiment, the MDMS is not required to communicate with the key management server when totalizing the encrypted data items received from the SMs. Therefore, the MDMS can perform the totalizing process without synchronizing with the key management server. Further, the volume of the information transmitted from the key management server can be reduced by performing another encryption process between the key management server and the EMS.

Hereinafter, a power consumption calculating system having the EMS as an application server will be further explained in detail.

The EMS controls power for a targeted management region based on the total of a plurality of power consumptions per first unit time collected from a plurality of SMs in the targeted management region (hereinafter referred to as first total power consumption). Here, the first unit time shows time intervals (e.g. 30 minutes) at which the EMS carries out power control. The power consumption measured by the SM corresponds to power consumption per the first unit time.

In the explanation to be given below, the SM measures power consumption in each home. However, a similar power consumption calculating system can be realized even when the SM measures the power consumption in a building such as an office building, the power consumption in a factory, or the power consumption in a region. Further, the application server should not be limited to the EMS, and another application server may be provided to carry out a predetermined application using the total power consumption. Furthermore, as will be mentioned later, the power consumption may be encrypted by a machine different from the SM, such as a concentrator, which is an aggregation device of the SMs, and an HES (Head End System) for temporarily storing the power consumption.

Note that the target equipment handled by the consumption calculating system according to the present embodiment can be applied not only to electrical equipment but also to various machines such as water equipment and gas equipment as long as the equipment is required to periodically calculate consumption.

FIG. 1 is a block diagram showing a structural example of a power consumption calculating system 1 according to an embodiment. As shown in FIG. 1, the power consumption calculating system 1 according to the present embodiment has an SM 10, an MDMS 30, an EMS 50, and a key management server 70, which are connected through a network 90. In FIG. 1, only one SM 10 is shown for simplification, but actually a plurality of SMs 10 are connected in the power consumption calculating system. The network 90 is, e.g., LAN (Local Area Network), intranet, Ethernet (registered trademark), Internet, etc.

The SM 10 is a facility installed in each home to measure the power consumption of electrical equipments used in each home. Note that each SM 10 is assigned identification information (hereinafter referred to as SM_ID) for identifying each SM 10, and each SM 10 stores the SM_ID assigned thereto.

The MDMS 30 is a system for collecting and managing the power consumptions from the SMs 10 in the respective homes through the network 90. The MDMS 30 may be formed of a plurality of devices, or may be formed as a single device. The following explanation is based on an assumption that the MDMS 30 is formed as a single device. Note that each MDMS 30 performs the process on a group-by-group basis, each group consisting of a plurality of SMs 10. Each MDMS 30 stores SM_GR_ID assigned to each SM 10 group. Here, the number of groups to be handled is only one for simplification, and the respective SMs 10 are assigned SM_IDs representing sequence numbers from 1 to id_end.

The EMS 50 grasps the total power consumption (first total power consumption) per the first unit time in a plurality of homes in a targeted management region, and controls power by requesting each home in the targeted management region to restrain power consumption, or by charging/discharging a storage battery connected to the power network, considering the balance between the first total power consumption and suppliable electric energy. The EMS 50 may be formed of a plurality of devices, or may be formed as a single device. The following explanation is based on an assumption that the EMS 50 is formed as a single device.

The key management server 70 shares a secret key with the SM 10, and generates a decryption key (mentioned later) at regular time intervals and transmits it to the EMS 50. Further, when receiving a request for a decryption key from the EMS 50, the key management server 70 generates a decryption key and transmits it to the EMS 50.

Note that each of the MDMS 30, EMS 50, and key management server 70 stores SM_IDs of all SMs 10 connected to the power consumption calculating system 1. Further, the power consumption per the first unit time measured by the SM 10 is related at least to its SM_ID and time information showing the time at which the measurement is carried out. Encrypted power consumption data is generated utilizing the time information related to the power consumption. In addition to the SM_ID and time information, further information may be related to the power consumption and used to generate the encrypted data.

The SM 10 retains a unique secret key, and the same secret key is retained in the key management server 70. The secret key of the SM 10 may be embedded in the SM 10 before shipped from the factory, may be generated inside the SM 10 when the SM 10 is installed in a home and transmitted to the key management server 70 through the network 90, or may be distributed from the key management server 70 through the network 90 after the SM 10 is installed in a home. Further, the SM 10 retains an encryption key used to encrypt the power consumption. The SM 10 generates the encryption key from the secret key. Further, the EMS 50 retains a decryption key used to decrypt the total power consumption, and the same decryption key is retained in the key management server 70. The key management server 70 generates and updates the decryption key from a plurality of secret keys, and provides it to the EMS 50.

In the power consumption calculating system having such a configuration, the SM 10 generates encrypted data by encrypting power consumption per the first unit time using the encryption key of its own. The encrypted data generated by the SM 10 is transmitted to the MDMS 30 through the network 90.

The MDMS 30 receives and retains the encrypted data transmitted from the SM 10. Responding to a request from the EMS 50, the MDMS 30 generates encrypted total power consumption data by totalizing a plurality of encrypted data items collected from the SMs 10 in the homes included in a targeted management region of the EMS 50. Then, the MDMS 30 transmits the obtained encrypted total power consumption data to the EMS 50 through the network 90.

The EMS 50 receives, as a response to the request, the encrypted total power consumption data transmitted from the MDMS 30 through the network 90, and decrypts it with a decryption key to generate a total power consumption. Then, the EMS 50 controls power for the targeted management region based on the obtained total power consumption.

Next, hardware configurations of the SM 10, MDMS 30, EMS 50, and key management server 70 will be explained.

The SM 10 has a controller (e.g. CPU) for controlling the whole device, a main storage (e.g.) RAM serving as a work area of the CPU, an auxiliary storage (e.g. ROM, nonvolatile memory, etc.) for storing various data and various programs, and a bus for connecting these units. The SM 10 is formed similarly to dedicated hardware or an embedded device. Further, the SM 10 has a communication I/F for performing communication through the network 90. Furthermore, the SM 10 is connected to a display for displaying various information such as power consumption, and an input unit such as operation buttons or a keyboard through which user operation is inputted.

Each of the MDMS 30, EMS 50, and key management server 70 has a controller (e.g. CPU (Central Processing Unit)) for controlling the whole device and carrying out fundamental operation, a main storage (e.g. RAM (Random Access Memory)) serving as a work area of the CPU, an auxiliary storage (e.g. ROM (Read Only Memory), HDD (Hard Disk Drive), CD (Compact Disk) drive device, etc.) for storing various data and various programs and a bus for connecting these parts. Each of the MDMS 30, EMS 50, and key management server 70 has a hardware configuration utilizing a normal computer. Further, each of the MDMS 30, EMS 50, and key management server 70 has a communication I/F (Interface) for performing communication through the network 90.

Next, the SM 10, MDMS 30, EMS 50, and the key management server 70 having such hardware configurations will be explained in terms of their various functions.

Figure 2:
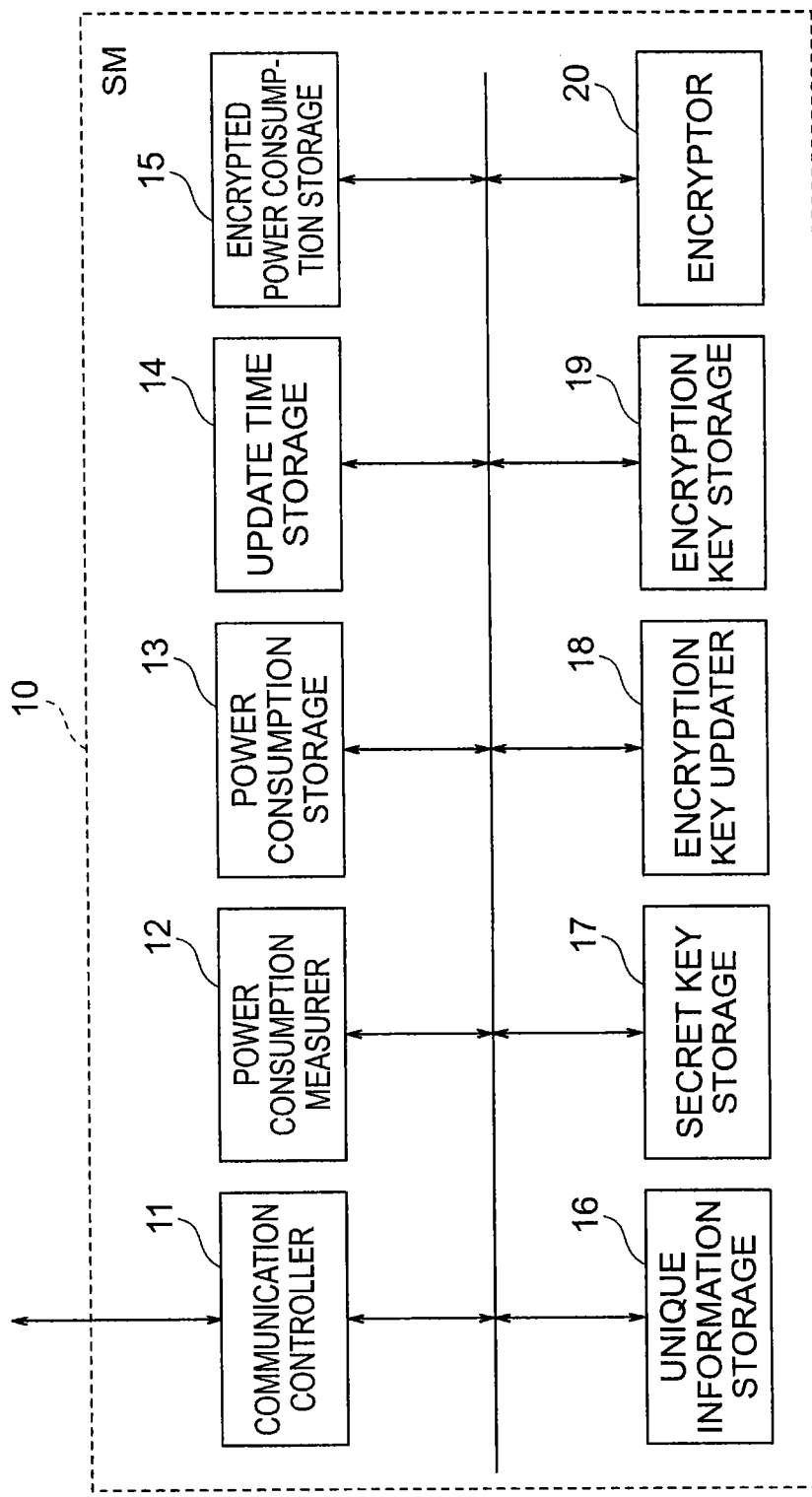
FIG. 2 is a block diagram showing an example of a functional structure of an SM.

First, various functions realized by the SM 10 will be explained. FIG. 2 is a block diagram showing an example of a functional structure of the SM 10. As shown in FIG. 2 for example, the SM 10 has a communication controller 11, a power consumption measurer 12, a power consumption storage 13, an update time storage 14, an encrypted power consumption storage 15, a unique information storage 16, a secret key storage 17, an encryption key updater 18, an encryption key storage 19, and an encryptor 20. The functions of the communication controller 11 are realized by the communication I/F and various programs carried out by the CPU. The functions of each of the power consumption measurer 12, encryption key updater 18, and encryptor 20 are realized by various programs carried out by the CPU. Each of the power consumption storage 13, update time storage 14, encrypted power consumption storage 15, unique information storage 16, secret key storage 17, and encryption key storage 19 is a storage area secured in the auxiliary storage for example.

The communication controller 11 controls the communication with the MDMS 30 through the network 90. Concretely, the communication controller 11 receives a control command transmitted from the MDMS 30, transmits, to the MDMS 30, encrypted data obtained by encrypting the power consumption stored in the power consumption storage 13 by using the encryptor 20 (mentioned later), and receives time information from an external time server to achieve synchronization.

The power consumption measurer 12 measures a power consumption of electrical equipment at every first unit time in each home. Then, the power consumption measurer 12 stores the measured power consumption in the power consumption storage 13. Further, the power consumption measurer 12 starts or stops measuring the power consumption depending on the control command received by the communication controller 11.

The power consumption storage 13 stores the power consumption per the first unit time measured by the power consumption measurer 12. The power consumption stored in the power consumption storage 13 is eliminated after a first predetermined time has passed. Here, the first predetermined time shows 2 weeks, 30 days, etc. determined depending on, e.g., the size of the storage area of the SM 10.

The update time storage 14 stores a time at which the encryption key was updated so that the update time is used by the encryption key updater. The time (update time) stored in the update time storage 14 is rewritten when activating the encryption key updater 18.

The encrypted power consumption storage 15 stores the encrypted power consumption calculated by the encryptor 20. The power consumption stored in the power consumption storage 13 is eliminated after the first predetermined time has passed.

The unique information storage 16 stores information which is required by the SM 10 and should not be stored in the power consumption storage 13, update time storage 14, encrypted power consumption storage 15, secret key storage 17, and encryption key storage 19. Concretely, the unique information storage 16 stores SM_ID uniquely retained by the SM 10, and $t\_\delta$ representing an update frequency of the update time stored in the update time storage 14.

The secret key storage 17 stores a secret key used to update the encryption key.

The encryption key updater 18 recalculates the encryption key after a second predetermined time has passed, to generate a new encryption key. Then, the encryption key updater 18 stores the generated encryption key in the encryption key storage 19. Here, the second predetermined time shows 6 hours, 1 day, etc., which is shorter than $t\delta$ representing the update frequency of the update time and stored in the unique information storage 16. How to generate the encryption key will be mentioned in detail later.

The encryption key storage 19 stores the encryption key for encrypting the power consumption to generate encrypted data.

The encryptor 20 generates encrypted data by encrypting the power consumption per the first unit time stored in the power consumption storage 13 with the encryption key stored in the encryption key storage 19. In the encryption system of the present embodiment, the power consumption is encrypted utilizing the secret key shared with the key management server 70. How to encrypt the power consumption will be mentioned in detail later.

Here, the secret key will be explained. The secret key is defined as a secret key Ksm shared only between the SM 10 and the key management server 70. The secret key Ksm is stored in the secret key storage 17 of the SM 10. Update frequency of the secret key shows generally a relatively long period (e.g., a half year, several years, etc.), which depends on the policy set by an SM administrator. Therefore, the secret key Ksm is updated generally in a longer cycle than the updating cycle of the encryption key.

Next, the encryption key will be explained. The encryption key is a key used to encrypt the power consumption, and is generated using the secret key Ksm and time information. The time information is shown as, e.g., "Jan. 1, 2012," "14:35:46, 1/1/2012," UNIX (registered trademark) time (the number of seconds that have elapsed since 00:00:00 (GMT), 1 Jan., 1970), etc. When the secret key is defined as k_SM and the update time is defined as t_up_SM, an encryption key Kenc can be calculated by the following Formula (1).

$$K\text{enc}=H1(k\_SM, t\_up\_SM) \quad (1)$$

Here, H1(x, y) is a one-way function or a keyed hash function taking inputs x and y. For example, the one-way function is sha-1, md5, sha256, etc., and the keyed hash function is hmac, omac, etc.

The encryption key is updated at the time when current time t_1 exceeds update time t_up_SM stored in the update time storage 14. t_up_SM is updated at every $t\delta$, i.e. at a constant frequency. $t\delta$ is stored in the unique information storage 16. When starting the SM 10, t_up_SM is calculated using the current time t_1, based on the following Formula (2).

$$t\_up\_SM = t\delta * INT(t\_1/t\_\delta) \quad (2)$$

Here, INT(x) is a function taking input x and outputting the integer part of x.

The encryption key Kenc is updated using Formula (1) at the time when $t\delta$ has passed from the previous update time t_up_SM. The updated encryption key is stored in the encryption key storage 19. In addition, the update time t_up_SM is updated by adding $t\delta$ to the previous update time t_up_SM. The updated update time is stored in the update time storage 14.

Next, a concrete example of the encryption performed by the encryptor 20 will be explained. The encryption method used in the present embodiment is based on homomorphic encryption. When Enc_P(ek_P, d) for encrypting data d with an encryption key ek_P is homomorphic encryption, data d and data d' satisfy the following relationship: Enc_P(ek_P, d)*Enc_P(ek_P, d')=Enc_P(ek_P, d+d'). Here, + represents arithmetical addition and * represents an appropriate operator. As examples of such an encryption method, there are Caesar cipher using a sufficiently large radix, the encryption described in Reference 1 shown below, etc., in which * represents addition and residue multiplication in a residue class ring.

(Reference 1) Pascal Paillier, Public-Key Cryptosystems Based on Composite Degree Residuosity Classes, EUROCRYPT 1999, pp 223-238

Now, explanation will be given on a concrete example of how to generate encrypted data by encrypting power consumption. Here, dt represents power consumption measured by the power consumption measurer 12 in the first unit time represented as time information t. First, the encryptor 20 calculates ct in accordance with the following Formula (2).

$$ct = dt + K\text{enc} * H2(t) \quad (2)$$

Here, Kenc represents an encryption key obtained using update time tup, and H2(x) represents a one-way function or a keyed hash function taking input x.

Note that the time information t, which is required in the subsequent steps, should be transmitted to the MDMS 30 together with encrypted data. Accordingly, data Csm_t transmitted from the SM 10 to the MDMS 30 relates to the encrypted data (ct) and time information t, as shown in the following Formula (5).

$$Csm\_t = (ct, t) \quad (5)$$

In the following explanation, the data Csm_t=(ct, t) relating to the encrypted data ct and time information t is handled as encrypted power consumption data.

Figure 3:
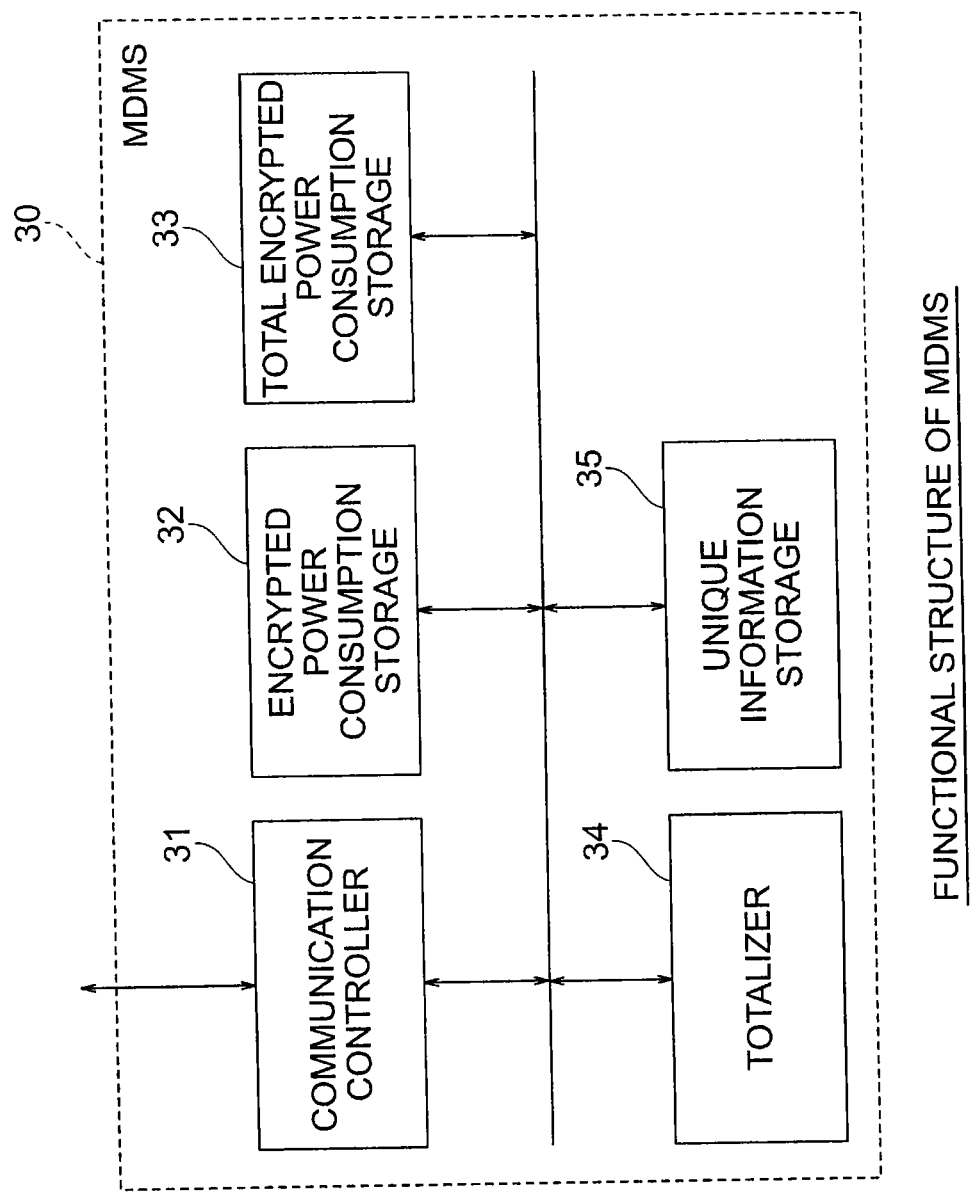
FIG. 3 is a block diagram showing an example of a functional structure of an MDMS.

Next, various functions realized by the MDMS 30 will be explained. FIG. 3 is a block diagram showing an example of a functional structure of the MDMS 30. As shown in FIG. 3 for example, the MDMS 30 has a communication controller 31, an encrypted power consumption storage 32, a total encrypted power consumption storage 33, a totalizer 34, and a unique information storage 35. The functions of the communication controller 31 are realized by the communication I/F and various programs carried out by the CPU. The functions of the totalizer 34 are realized by various programs carried out by the CPU. Each of the encrypted power consumption storage 32, total encrypted power consumption storage 33, and unique information storage 35 is a storage area secured in the auxiliary storage for example.

The communication controller 31 controls the communication with other devices such as the SM 10 and EMS 50 through the network 90. Concretely, the communication controller 31 receives, from the SM 10, encrypted power consumption data at every first unit time, transmits a control command to the SM 10, and transmits, to the EMS 50, encrypted total power consumption data generated by the totalizer 34. Note that the control command transmitted to the SM 10 is a command to stop/start measuring the power consumption, or to transmit the power consumption, for example.

The encrypted power consumption storage 32 stores the encrypted power consumption data per the first unit time received by the communication controller 31 from the SM 10.

The total encrypted power consumption storage 33 stores the encrypted total power consumption data generated by the totalizer 34. The encrypted total power consumption data corresponds to encrypted total power consumption data obtained by totalizing a plurality of power consumptions per the first unit time.

Responding to a request from the EMS 50, the totalizer 34 generates encrypted total power consumption data by totalizing a plurality of encrypted data items about power consumptions per the first unit time which are stored in the encrypted power consumption storage 32 after being collected from the SMs 10 in all homes included in a management group determined by the EMS 50. The encrypted total power consumption data generated by the totalizer 34 is transmitted from the communication controller 31 to the EMS server 30 through the network 90.

Here, explanation will be given on a concrete example of how to generate the encrypted total power consumption data by totalizing a plurality of encrypted data items. Here, it is assumed that three SMs 10 are handled in the totalization. The three SM 10 are defined as SM 10-1, SM 10-2, and SM 10-3 respectively, and these are assigned SM ids 1, 2, and 3 respectively. When encrypted data items about power consumptions per the first unit time represented as the time information t measured by the SM 10-1, SM 10-2, and SM 10-3 are defined as $Csm\_1\_t$, $Csm\_2\_t$, and $Csm\_3\_t$ respectively, these can be expressed as the following Formulas (6) to (8).

$$Csm\_1\_t=(ct\_1,t) \quad (6)$$

$$Csm\_2\_t=(ct\_2,t) \quad (7)$$

$$Csm\_3\_t=(ct\_3,t) \quad (8)$$

At this time, when the encrypted total power consumption data is defined as $Csm\_A(123)\_(t)$, the totalizer 34 can obtain the encrypted total power consumption data using the following Formula (9).

$$Csm\_A(123)\_(t)=(CA\_c,t) \quad (9)$$

Note that $CA\_c = ct\_1 + ct\_2 + ct\_3$.

Figure 4:
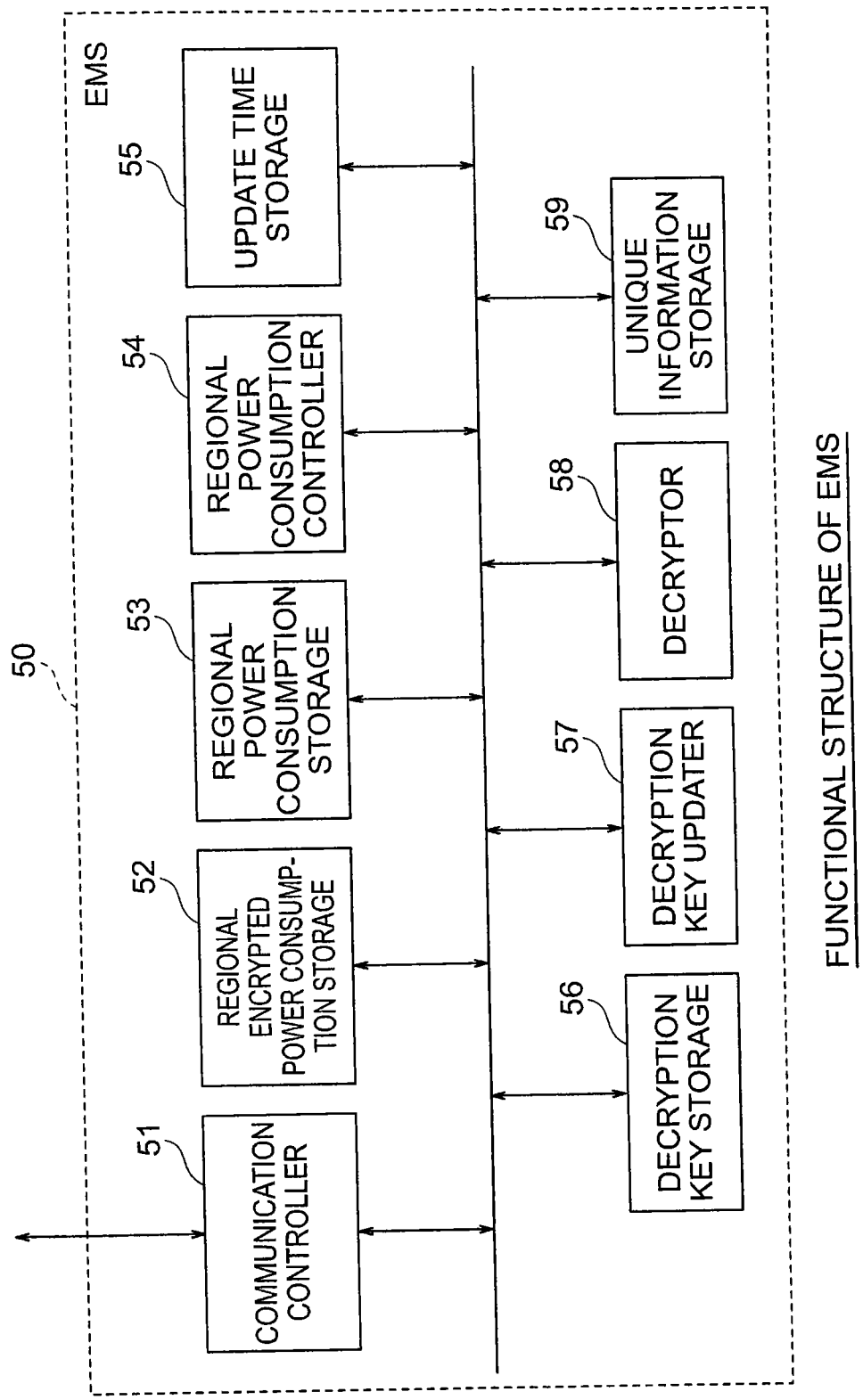
FIG. 4 is a block diagram showing an example of a functional structure of an EMS.

Next, various functions realized by the EMS 50 will be explained. FIG. 4 is a block diagram showing an example of a functional structure of the EMS 50. As shown in FIG. 4 for example, the EMS 50 has a communication controller 51, a regional encrypted power consumption storage 52, a regional power consumption storage 53, a regional power consumption controller 54, an update time storage 55, a decryption key storage 56, a decryption key updater 57, a decryptor 58, and a unique information storage 59. The functions of the communication controller 51 are realized by the communication I/F and various programs carried out by the CPU. The functions of each of the decryptor 58, decryption key updater 57, and regional power consumption controller 54 are realized by various programs carried out by the CPU. Each of the regional encrypted power consumption storage 52, update time storage 55, decryption key storage 56, and unique information storage 59 is a storage area secured in the auxiliary storage for example.

The communication controller 51 controls the communication with the MDMS 30 and key management server 70 through the network 90. Concretely, the communication controller 51 receives the encrypted total power consumption data transmitted from the MDMS 30, and receives a decryption key transmitted from the key management server.

The regional encrypted power consumption storage 52 stores the encrypted total power consumption data received by the communication controller 51.

The regional power consumption storage 53 stores the first total power consumption obtained by decrypting the encrypted total power consumption data stored in the regional encrypted power consumption storage 52 by using the decryptor 58.

The decryption key storage 56 stores a decryption key s received from the key management server 70. The decryption key s is generated by the key management server 70 using the secret key of the SM and update time. How to generate the decryption key will be mentioned in detail later.

Now, explanation will be given on a concrete example of how the decryptor 58 generate the first total power consumption by decrypting the encrypted total power consumption data with the decryption key s. Here, assume a case where the communication controller 51 receives, from the MDMS 30, encrypted data about the first total power consumption $Csm\_A(123)\_(t)=(CA\_c, t)$.

First, the decryptor 58 judges whether the following conditional expression (10) is satisfied by using the time information t included in the encrypted total power consumption data received from the MDMS 30 and the update time tup.

$$tup <= t < tup + t\delta \quad (10)$$

If this conditional expression is not satisfied, the decryption key is judged to be invalid, and the decoding process is stopped. When the decoding process is stopped, the EMS 50 transmits requests to the key management server 70 to transmit a decryption key corresponding to the time information t.

Next, first total power consumption d_EMS is obtained by calculating the following Formula (11) using the time information t included in the encrypted total power consumption data received from the MDMS 30 and the decryption key s retained in the decryption key storage 56.

$$d\_EMS = CA\_c - s*H2(t) \quad (11)$$

Here, H2(x) represents a one-way function or a keyed hash function taking input x, as stated above.

The regional power consumption controller 54 controls power for a targeted management region based on the first total power consumption generated by the decryptor 58. The power control means, e.g., requesting each home in the targeted management region to restrain power consumption when the first total power consumption exceeds the maximum value, discharging a storage battery connected to the power network, or storing surplus available power in the storage battery connected to the power network when the first total power consumption is lower than the lower limit value.

The decryption key updater 57 updates decryption key s_EMS and t_up_EMS using decryption key s_KM and t_up_KM received from the key management server. The key management server 70 transmits, to the EMS 50, the decryption key and update time each time the decryption key is updated, and the EMS directly stores the received decryption key and update time.

If no appropriate decryption key can be acquired and decryption in the decryptor 58 is stopped, the EMS 50 requests the key management server to transmit a decryption key corresponding to the time information used in the decryption. The EMS 50 stores the decryption key and update time transmitted from the key management server 70 as a response to the request.

The unique information storage 59 stores information which is required by the EMS 50 and should not be stored in the regional encrypted power consumption storage 52, update time storage 55, and decryption key storage 56. Concretely, the unique information storage 59 stores tδ representing an update frequency of the update time stored in the update time storage 55.

Figure 5:
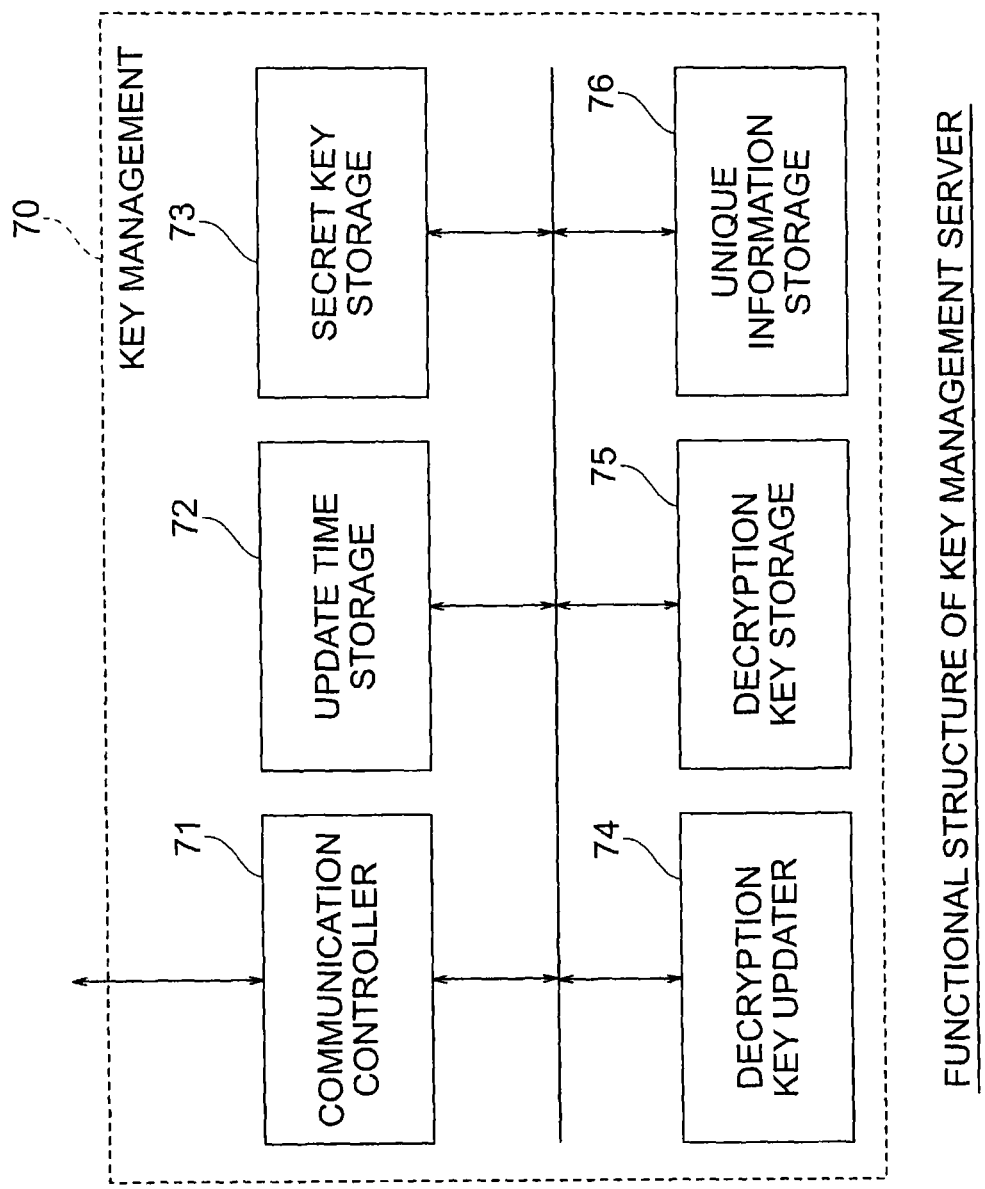
FIG. 5 is a block diagram showing an example of a functional structure of a key management server.

Next, various functions realized by the key management server 70 will be explained. FIG. 5 is a block diagram showing an example of a functional structure of the key management server 70. As shown in FIG. 5 for example, the key management server 70 has a communication controller 71, an update time storage 72, a secret key storage 73, a decryption key updater 74, a decryption key storage 75, and a unique information storage 76. The functions of the communication controller 71 are realized by the communication I/F and various programs carried out by the CPU. The functions of the decryption key updater 74 are realized by various programs carried out by the CPU. Each of the update time storage 72, secret key storage 73, and decryption key storage 75 is a storage area secured in the auxiliary storage for example.

The communication controller 71 controls the communication with the EMS 50 through the network 90. Concretely, the communication controller 71 transmits the decryption key generated by the decryption key updater 74 (mentioned later) to the EMS 50.

The update time storage 72 stores t_up_KM representing the update time of the decryption key, which is used by the decryption key updater 74.

The secret key storage 73 stores the secret key Ksm shared with the SM 10 as stated above.

Every second predetermined time or when receiving a request for a decryption key from the EMS, the decryption key updater 74 generates a decryption key using the secret keys Ksm of all SMs 10 stored in the secret key storage 73 and the update time information t_up_KM stored in the update time storage 72.

Now, explanation will be given on a concrete example of how the decryption key updater 74 generates a decryption key for a targeted group of SMs 10. Here, it is assumed that three SMs 10 are handled. The three SM 10 are defined as SM 10-1, SM 10-2, and SM 10-3 respectively, and these are assigned SM ids 1, 2, and 3 respectively. The SM 10-1, SM 10-2, and SM 10-3 retain secret keys k_SM_1, k_SM_2, and k_SM_3 respectively. Referring to these secret keys, partial encryption keys s_1, s_2, s_3 expressed in the following Formulas (12) to (14) are calculated first.

$$s\_1 = H1(k\_SM\_1, t\mathrm{up}) \quad (12)$$

$$s\_2 = H1(k\_SM\_2, t\mathrm{up}) \quad (13)$$

$$s\_3 = H1(k\_SM\_3, t\mathrm{up}) \quad (14)$$

Note that H1(x, y) represents a one-way function or a keyed hash function taking inputs x and y, as stated above.

A decryption key for the group consisting of SM 10-1, SM 10-2, and SM 10-3 is generated based on the following Formula (15), using the above Formulas (12) to (14).

$$s = s\_1 + s\_2 + s\_3 \quad (15)$$

The decryption key storage 75 stores the decryption key generated by the decryption key updater 74.

The unique information storage 76 stores information which is required by the key management server 70 and should not be stored in the secret key storage 73 and decryption key storage 75. Concretely, the unique information storage 76 stores tσ representing an update frequency of the update time stored in the update time storage 72.

Next, various processing steps carried out in the power consumption calculating system according to the present embodiment will be explained referring to the flow charts of FIGS. 6 to 16.

Figure 6:
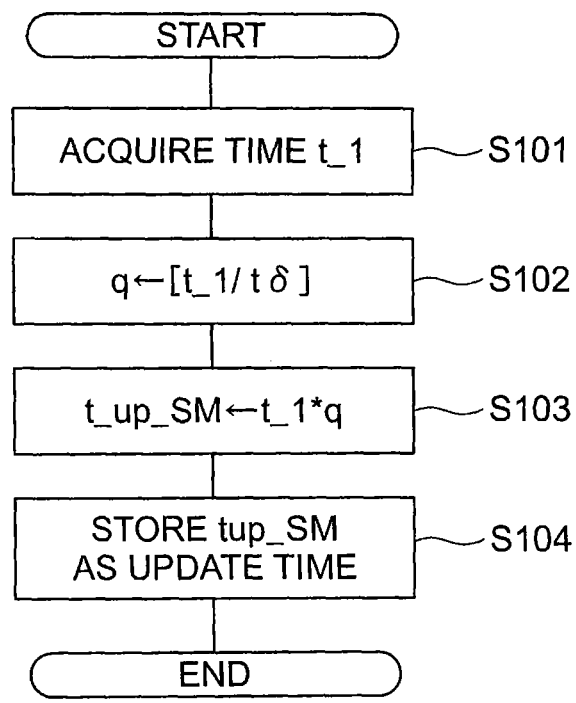
FIG. 6 is a flow chart showing an example of the operating procedure carried out by the SM.

First, an operating procedure performed by the SM 10 to generate the update time t_up_SM at the time of initial startup will be explained using FIG. 6. FIG. 6 is a flow chart showing an example of the operating procedure carried out by the SM 10.

First, the SM 10 acquires time t_1 (Step S101). Then, the SM 10 generates the update time t_up_SM using tδ stored in the unique information storage and the time t_1 (Steps S103 and S104). The generated t_up_SM is stored in the update time storage 14 as an update time (Step S104).

Figure 7:
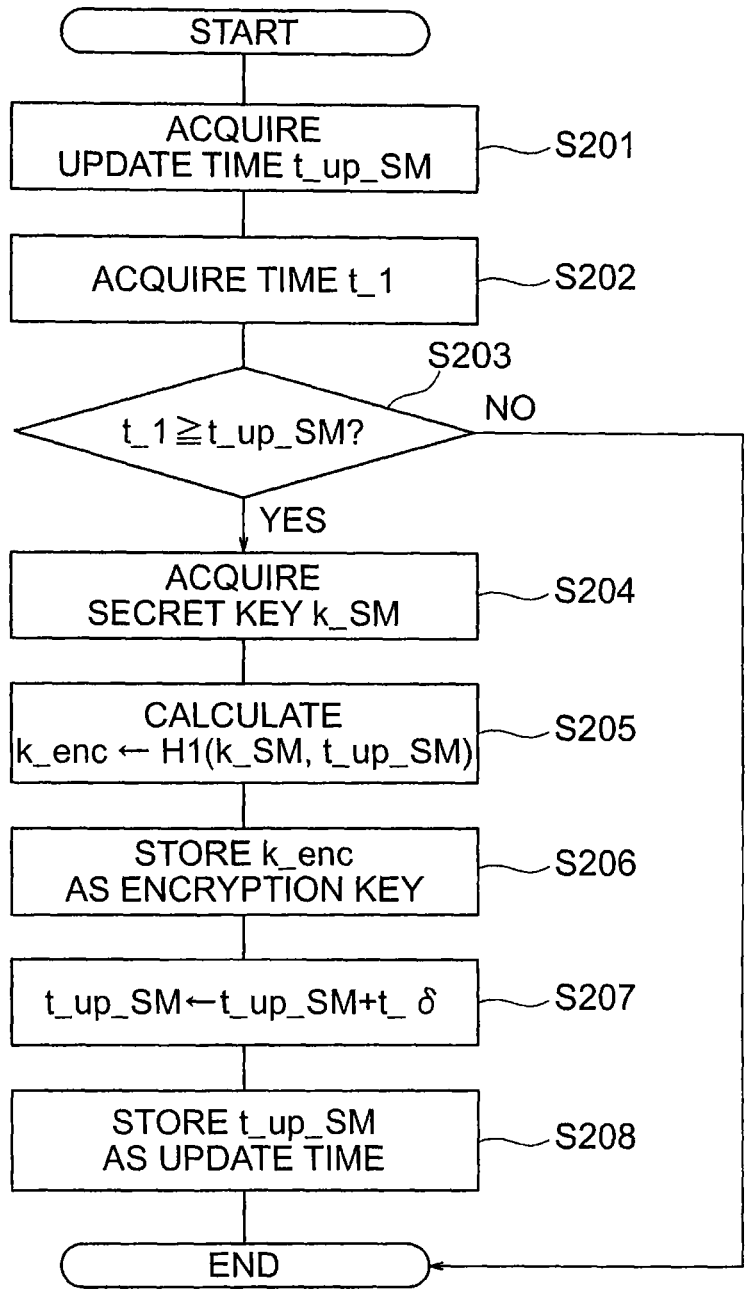
FIG. 7 is a flow chart showing an example of the operating procedure carried out by the SM.

Next, an operating procedure performed by the SM 10 to update the encryption key at regular time intervals will be explained using FIG. 7. FIG. 7 is a flow chart showing an example of the operating procedure carried out by the SM 10.

First, the SM 10 acquires update time t_up and time t_1 (Steps S201 and S202), and compares the values of t_1 and tup (Step S203). Only when t_1 is equal to or larger than tup, the subsequent steps are carried out. When t_1 is smaller than tup, update of the encryption key is stopped.

Next, the SM 10 acquires a secret key k_SM (Step S204), and calculates an encryption key k_enc (Step S205). k_enc is stored in the encryption key storage 19 (Step S206). Then, the update time t_up is updated (Step S207), and stored as the update time of the encryption key (Step S208).

Figure 8:
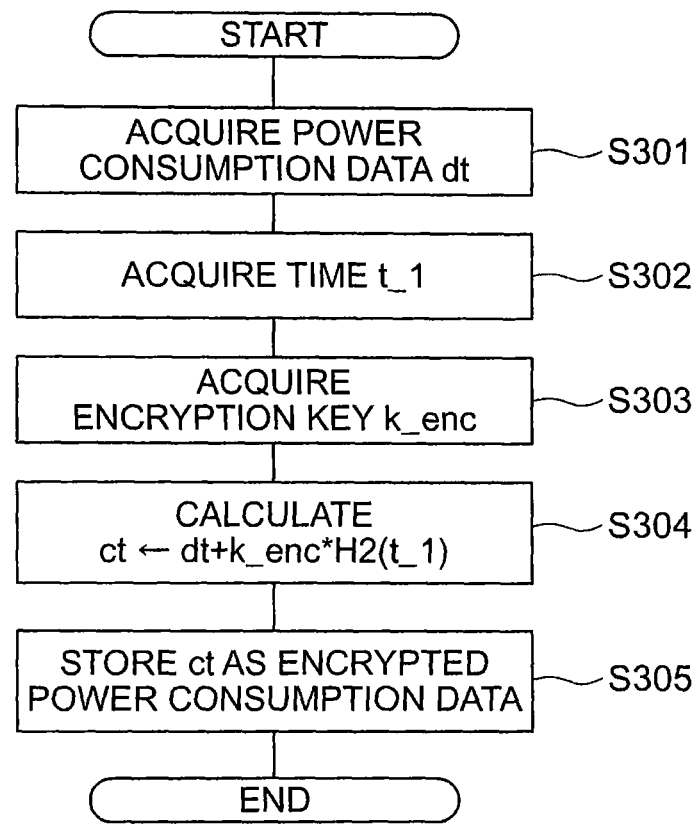
FIG. 8 is a flow chart showing an example of the operating procedure carried out by the SM.

An operating procedure performed when the SM 10 generates encrypted power consumption data procedure will be explained using FIG. 8. FIG. 8 is a flow chart showing an example of the operating procedure carried out by the SM 10.

The SM 10 measures a power consumption dt of electrical equipment per the first unit time (Step S301), and acquires time t_1 (Step S302). Further, the SM 10 acquires the encryption key k_enc from the encryption key storage 19 (Step S303).

The SM 10 encrypts the measured power consumption dt using the encryption key k_enc acquired at Step S303 and the time information t_1, and generates encrypted data ct (Step S304). The SM 10 transmits, to the MDMS 30, the encrypted data ct generated at Step S204 while relating it to the time information t_1 (Step S305). At this time, the SM 10 further transmits an identification code SM_ID assigned to the SM 10.

Figure 9:
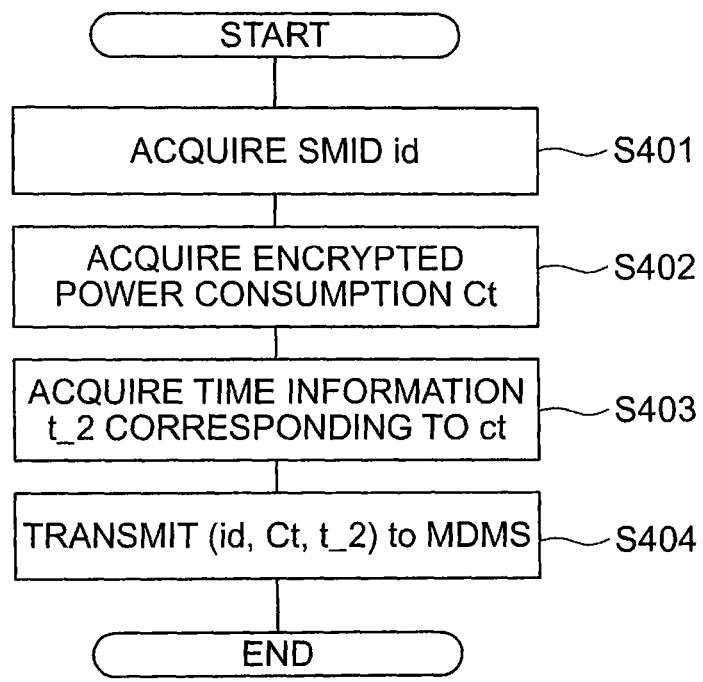
FIG. 9 is a flow chart showing an example of the operating procedure carried out by the SM.

Next, an operating procedure performed by the SM 10 to transmit the encrypted power consumption data to the MDMS 30 will be explained using FIG. 9. FIG. 9 is a flow chart showing an example of the operating procedure carried out by the SM 10.

First, the SM 10 acquires the identification code SM_ID and encrypted power consumption ct (Steps S401 and S402). Next, the SM 10 acquires time information t_2 corresponding to the encrypted data ct (Step S403). The SM 10 transmits, to the MDMS 30, the acquired SM_ID, ct, and t_2 as a group (Step S404).

The information to be transmitted should not be limited only to id, ct, and t_2. For example, information for identifying the SM 10 may be further included.

Figure 10:
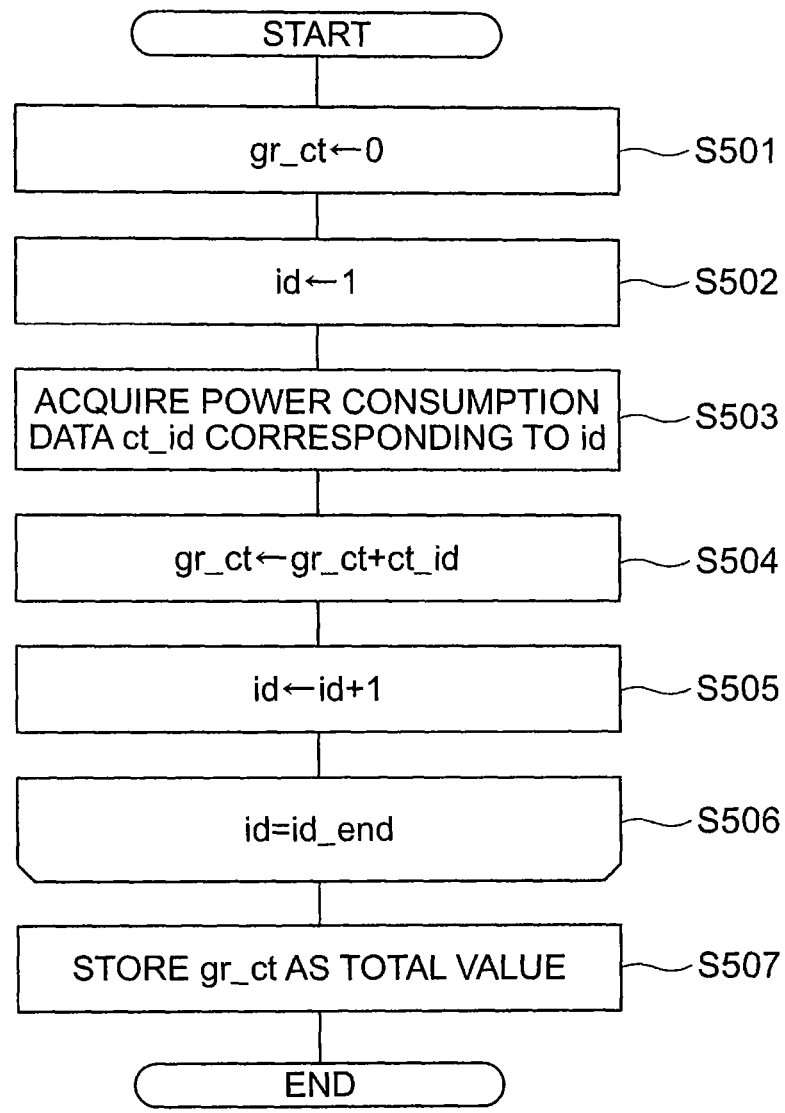
FIG. 10 is a flow chart showing an example of the operating procedure carried out by the MDMS.

Next, an operating procedure performed by the MDMS 30 to totalize the encrypted power consumptions received from the SM 10 will be explained using FIG. 10. FIG. 10 is a flow chart showing an example of the operating procedure carried out by the MDMS 30.

First, the MDMS 30 prepares for calculating a total value by setting a variable gr_ct, which stores the total value, to 0 (Step S501). Further, the MDMS 30 prepares a loop variable by setting id to 1 (Step S502).

Next, the MDMS 30 acquires power consumption data ct_id corresponding to id (Step S503), and adds it to gr_ct (Step S504). Next, the MDMS 30 increases id by 1 (Step S505), and checks whether the id value is equal to id_end (Step S506). These steps are repeated until the id value becomes equal to id_end (Steps S505 and S506). By performing Steps S501 to S506, gr_ct stores the total sum of the power consumption data items ct_id corresponding to ids from 1 to id_end. Then, gr_ct is stored in the total encrypted power consumption storage 33 as a total value (Step S507).

Figure 11:
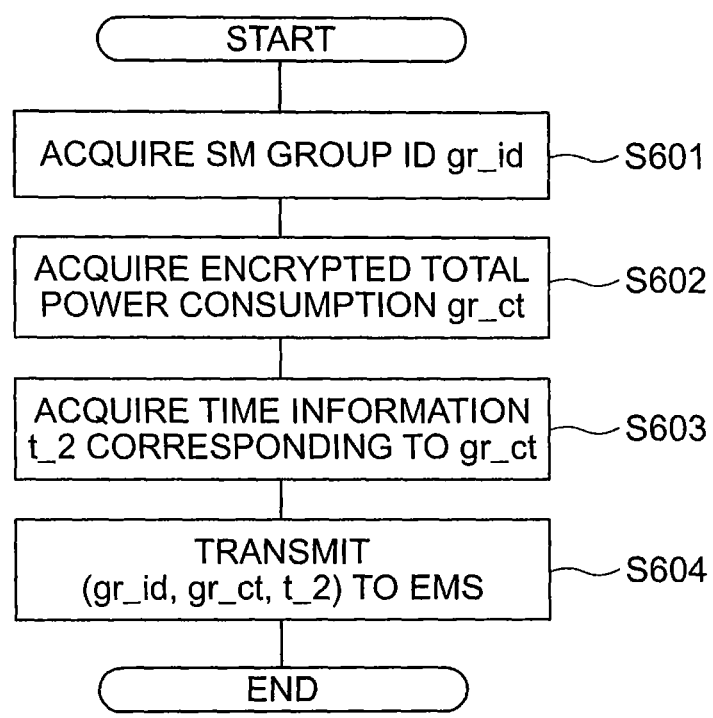
FIG. 11 is a flow chart showing an example of the operating procedure carried out by the MDMS.

Next, an operating procedure performed by the MDMS 30 to transmit encrypted total power consumption to the EMS 50 will be explained using FIG. 11. FIG. 11 is a flow chart showing an example of the operating procedure carried out by the MDMS 30.

First, the MDMS 30 acquires the identification code (SM group ID) gr_id of a group whose total power consumption should be calculated (Step S601), and acquires the encrypted total power consumption gr_ct stored in the total encrypted power consumption storage 33 and time information t_2 corresponding gr_ct (Steps S602 and S603). The MDMS 30 transmits, to the EMS 50, the acquired gr_id, gr_ct, and t_2 as a group (Step S604).

Note that the information to be transmitted should not be limited only to gr_id, gr_ct, and t_2. For example, information for identifying the MDMS 30 may be further included.

Figure 12:
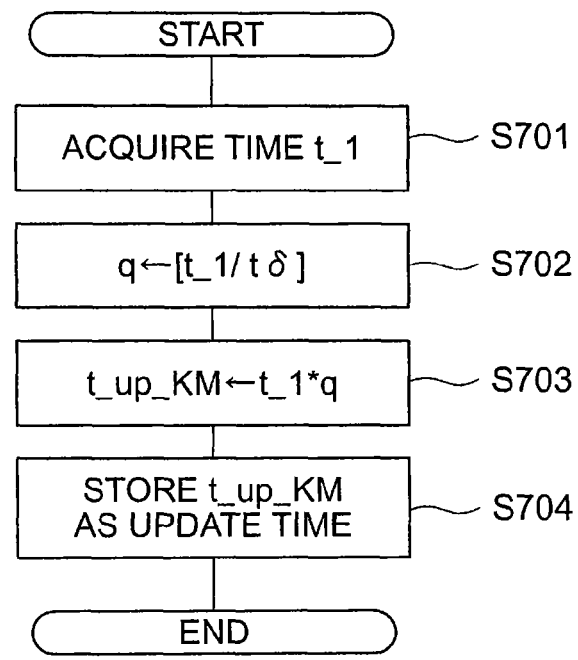
FIG. 12 is a flow chart showing an example of the operating procedure carried out by the key management server.

Next, an operating procedure performed by the key management server 70 to generate an update time at the time of initial startup or when receiving a request for a decryption key from the EMS 50 will be explained using FIG. 12. FIG. 12 is a flow chart showing an example of the operating procedure carried out by the key management server 70.

First, the key management server 70 acquires time t_1 (Step S701). Then, the key management server 70 generates update time t_up_KM using the update frequency to stored in the unique information storage and the time t_1 (Steps S702 and S703). The generated t_up_KM is stored in the update time storage 72 as an update time (Step S704).

Figure 13:
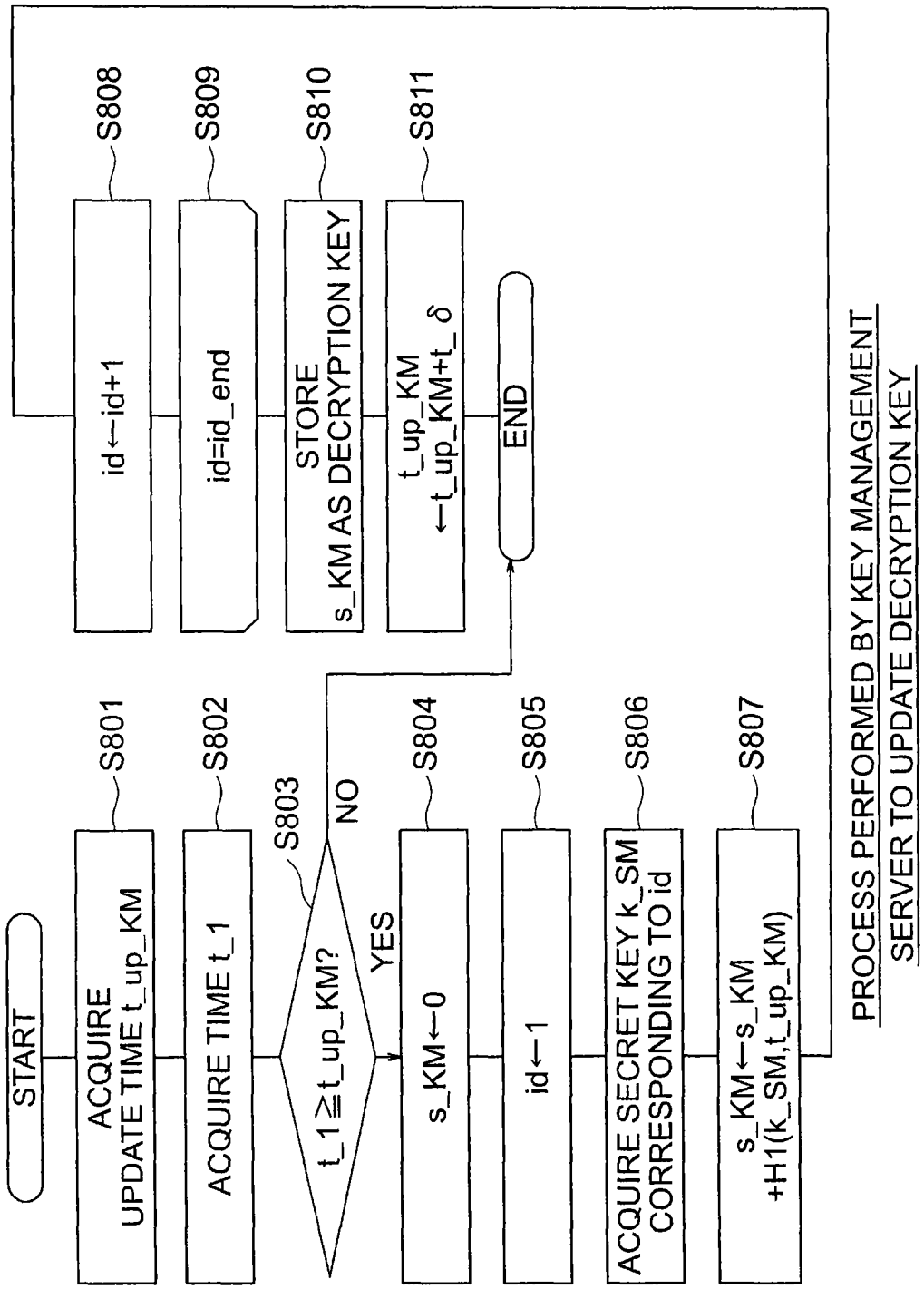
FIG. 13 is a flow chart showing an example of the operating procedure carried out by the key management server.

Next, an operating procedure performed by the key management server 70 to update a decryption key will be explained using FIG. 13. FIG. 13 is a flow chart showing an example of the operating procedure carried out by the key management server 70.

First, the key management server 70 acquires the update time t_up_KM stored in the update time storage 72 and the time information t_1 (Steps S801 and S802), and compares the values of t_1 and t_up_KM (Step S803). If t_1 is smaller than t_up_KM, it is judged that no update is necessary, and the update process is stopped. If not, the process is continued.

The key management server 70 prepares for calculating a decryption key by setting a variable s_KM, which retains the value of the decryption key, to 0 (Step S804). Further, the key management server 70 prepares a loop variable by setting id to 1 (Step S805).

Next, the key management server 70 acquires a secret key k_SM corresponding to id (Step S806), calculates H1(k_SM, t_up_KM) using k_SM and t_up_KM, and adds it to s_KM (Step S807). H1(x, y) represents a one-way function or a keyed hash function taking inputs x and y, as stated above. The key management server 70 increases id by 1, and checks whether the id value is equal to id_end (Steps S808 and S809.) These steps are repeated until the id value becomes equal to id_end. By performing Steps S801 to S809, s_KM stores a decryption key covering the SMs 10 having ids from 1 to id_end. Then, s_KM is stored in the decryption key storage 75 as a decryption key (Step S810). The decryption key s_KM is stored while being related to the update time t_up_KM (Step S811).

Figure 14:
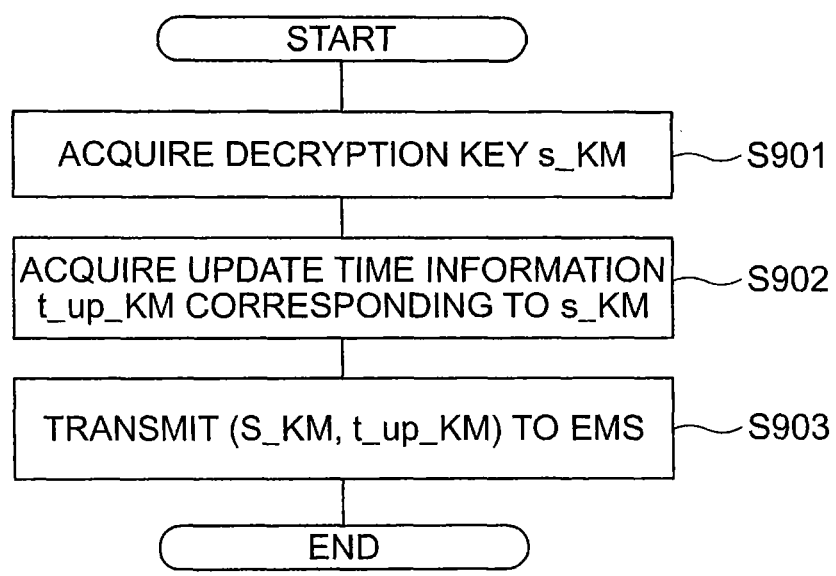
FIG. 14 is a flow chart showing an example of the operating procedure carried out by the key management server.

Next, an operating procedure performed by the key management server 70 to transmit the decryption key to the EMS 50 will be explained using FIG. 14. FIG. 14 is a flow chart showing an example of the operating procedure carried out by the key management server 70.

First, the key management server 70 acquires a decryption key s_KM from the decryption key storage 75 (Step S901), and then acquires update time t_up_KM corresponding to s_KM (Step S902). The key management server 70 transmits, to the EMS 50 the acquired s_KM and t_up_KM as a group (Step S903).

Note that the information to be transmitted should not be limited only to the decryption key s_KM and update time t_up_KM. For example, information for identifying the key management server 70 may be further included.

Figure 15:
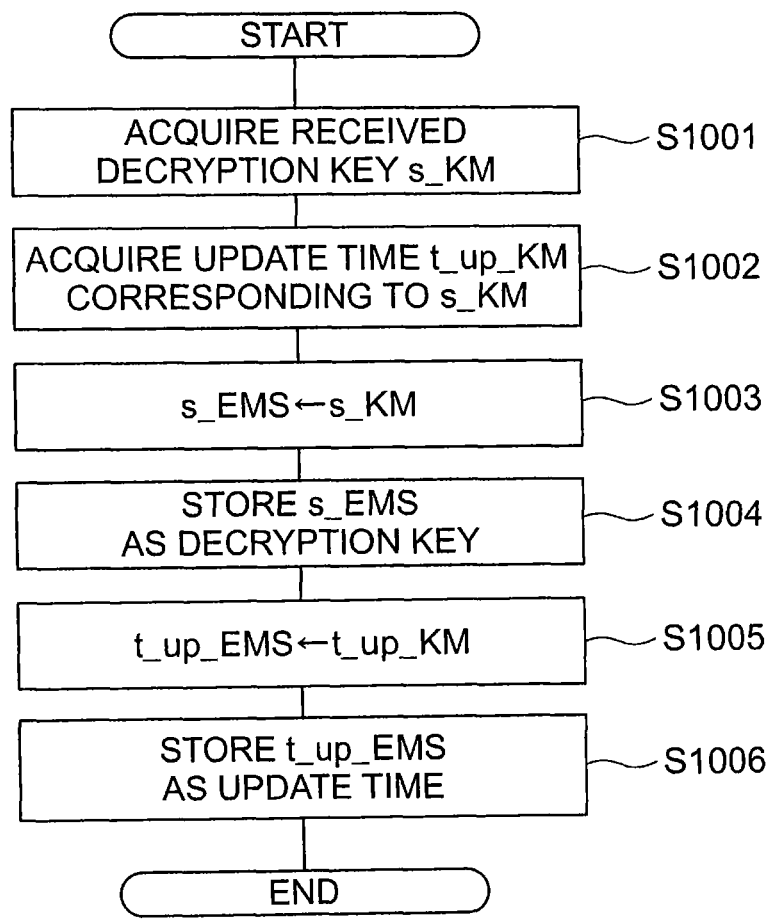
FIG. 15 is a flow chart showing an example of the operating procedure carried out by the EMS.

Next, an operating procedure performed by the EMS 50 to store the decryption key and update time will be explained using FIG. 15. FIG. 15 is a flow chart showing an example of the operating procedure carried out by the EMS 50.

First, the EMS 50 acquires the decryption key s_KM received by the communication controller 51 (Step S1001). Further, the EMS 50 acquires the update time t_up_KM corresponding to the decryption key s_KM received by the communication controller 51 (Step S1002). Next, the EMS 50 substitutes s_KM for s_EMS, and stores it in the decryption key storage 56 as a decryption key (Steps S1003 and S1004). Further, the EMS 50 substitutes t_up_KM for t_up_EMS, and stores it in the update time storage 55 as an update time (Steps S1005 and S1006).

Figure 16:
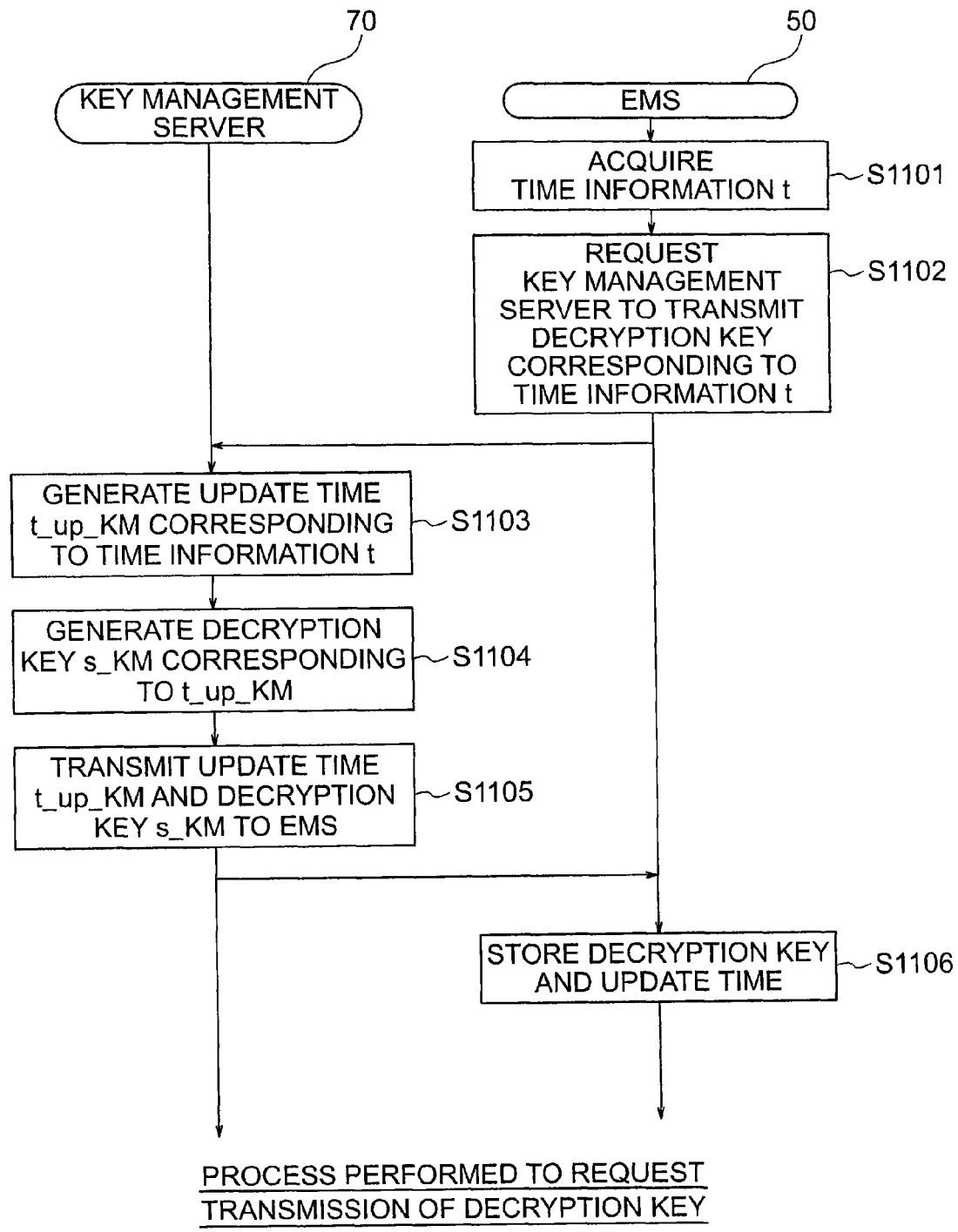
FIG. 16 is a flow chart showing an example of the operating procedure carried out by the key management server and the EMS.

Next, an operating procedure performed by the EMS 50 to store a decryption key transmitted from the key management server 70 as a response to a request for the decryption key from the EMS 50 will be explained using FIG. 16. FIG. 16 is a flow chart showing an example of the operating procedure carried out by the key management server 70 and the EMS 50.

First, the EMS 50 acquires time information t (Step S1101). Here, the time information to be acquired should not be limited to current time. For example, it may be the time related to the encrypted power consumption stored in the regional encrypted power consumption storage.

Next, the EMS 50 requests the key management server 70 to transmit a decryption key corresponding to the time information t (Step S1102). Concretely, the communication controller 51 transmits the time information t and a command requesting a decryption key to the key management server 70.

The key management server 70 generates an update time t_up_KM from the received time information t (Step S1103). Actually, t is used as time t_1 and the process shown in the flow chart of FIG. 12 is carried out.

Next, the key management server 70 generates a decryption key corresponding to the update time t_up_KM (Step S1104). Actually, t is used as time t_1 and the process shown in the flow chart of FIG. 13 is carried out.

Next, the key management server 70 transmits the update time t_up_KM and decryption key s_KM to the EMS 50 (Step S1105). The EMS 50 stores the decryption key and update time obtained from the received decryption key s_KM and update time t_up_KM in the decryption key storage 56 and update time storage 55 respectively (Step S1106). Actually, the process shown in the flow chart of FIG. 11 is carried out.

Figure 17:
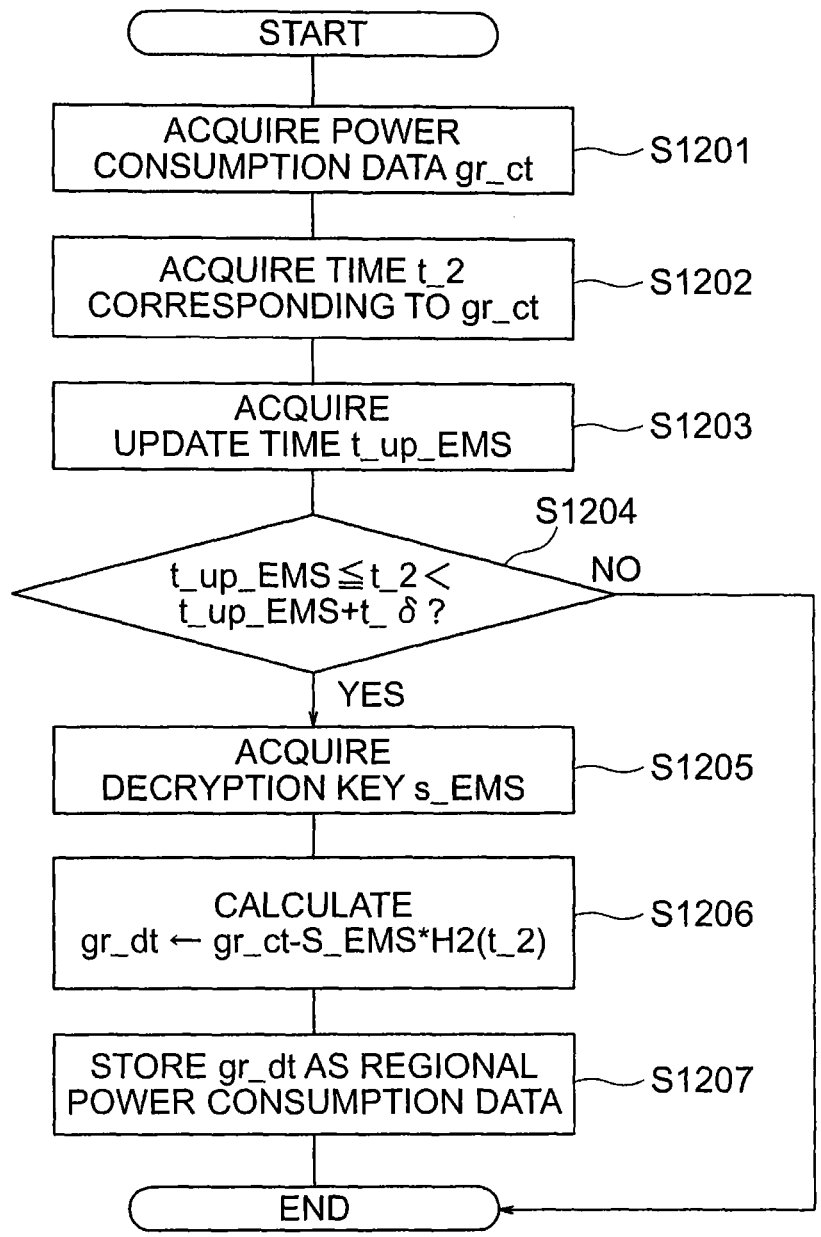
FIG. 17 is a flow chart showing an example of the operating procedure carried out by the EMS.

Next, an operating procedure performed when the EMS 50 decrypts encrypted total power consumption data will be explained using FIG. 17. FIG. 17 is a flow chart showing an example of the operating procedure carried out by the EMS 50.

First, the EMS 50 acquires power consumption data gr_ct from the regional encrypted power consumption storage 52 (Step S1201), and then acquires time t_2 related to gr_ct (Step S1202). Further, the EMS 50 acquires update time t_up_EMS from the update time storage 55 (Step S1203).

The EMS 50 compares the values of the acquired t_2 and t_up_EMS. If t_2 is smaller than t_up_EMS or t_2 is equal to or larger than t_up_EMS+tδ, it is judged that the EMS 50 has no appropriate decryption key, and the decoding process is stopped. When the decoding process is stopped, the EMS 50 requests a decryption key from the key management server 70, and performs the decoding process again.

Next, the EMS 50 acquires decryption key s_EMS from the decryption key storage 56 (Step S1205). Then, the value of gr_dt is obtained by subtracting the product of s_EMS and H2(t_2) from gr_ct (Step S1206). Here, H2(x) represents a one-way function or a keyed hash function taking input x, as stated above. Regional power consumption data gr_dt is stored in the regional power consumption storage 53 (Step S1207).

As stated above, in the present embodiment, the SM 10 shares a secret key with the key management server 70, periodically updates an encryption key using the secret key, generates encrypted power consumption data using the encryption key, and transmits the data to the MDMS 30. The MDMS 30 totalizes encrypted data items from the respective SMs 10 without decrypting them. Accordingly, the MDMS 30 cannot grasp the power consumption of each SM, which prevents the power consumption from being leaked through the MDMS 30.

Further, the encrypted total power consumption data generated by the MDMS 30 is transmitted to the EMS 50, and the EMS 50 detects total power consumption by decrypting the encrypted total power consumption data using a decryption key transmitted from the key management server 70. As stated above, since the key management server 70 generates a decryption key and transmits it to the EMS 50, there is no need to transmit key information to the MDMS 30. Accordingly, even if the communication between the MDMS 30 and EMS 50 is attacked, neither power consumption nor total power consumption can be leaked.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A measuring device, comprising:
a consumption measurer to measure a consumption of at least one target or target service at a predetermined time interval within a predetermined measurement area;
a consumption storage to store the measured consumption;
an update time storage to store a first time updated at a constant frequency;
a secret key storage to store a secret key shared with a key management device;
an encryption key updater to update an encryption key at a predetermined time period based on the secret key and the first time;
an encryptor to generate first encrypted data by encrypting the consumption using the encryption key and a second time associated with the consumption;
an encrypted data storage to store the first encrypted data;
a communication controller to control transmission of the first encrypted data, which is stored in the encrypted data storage, to a total consumption detecting device; and
wherein a total consumption corresponding to a plurality of the first encrypted data is restored, at a regional consumption controlling device which controls consumption of the at least one target or target service, based on second encrypted data, wherein the second encrypted data is generated at the total consumption detecting device by totalizing the plurality of first encrypted data corresponding to a certain time wherein the total consumption detecting device does not have access to a decryption key and the totalizing of the plurality of first encrypted data is performed without decrypting the plurality of first encrypted data and the decryption key is obtained by the regional consumption controlling device from a key management device by totalizing a plurality of the encryption keys used for calculation of the plurality of first encrypted data.

2. The measuring device of claim 1, further comprising:
an encryption key storage to store the encryption key,
wherein the communication controller controls the transmission of the first encrypted data stored in the encrypted data storage to the total consumption detecting device.

3. The measuring device of claim 1, wherein the predetermined time period expressing the constant frequency to update the encryption key is shorter than an update frequency of the secret key.

4. The measuring device of claim 1, further comprising:
a unique information storage to store update frequency information expressing the constant frequency to update the encryption key,
wherein the encryption key updater updates the encryption key before reaching a time obtained by adding the update frequency expressed by the update frequency information to the first update time stored in the update time storage.

5. The measuring device of claim 1, wherein the target is at least one of electricity, gas, and water.

6. The measuring device of claim 1, wherein the consumption storage deletes the consumption after a predetermined period is passed since the consumption is stored.

7. An information processor, comprising:
a regional encrypted data storage to store first encrypted data received from a total consumption detecting device;
a decryption key storage to store a decryption key updated by a key management device at a predetermined time period;
a decryptor to acquire a total consumption by decrypting the first encrypted data using time information included in the first encrypted data and the decryption key stored in the decryption key storage;
a regional consumption controller to control a consumption of a target in a predetermined targeted management region, based on the total consumption acquired by the decryptor;
a communication controller to control reception of the decryption key from the key management device;
an update time storage to store a first time at which the decryption key was updated;
a unique information storage to store update frequency information expressing an update frequency of the decryption key; and
a decryption key updater to update the decryption key before reaching a time obtained by adding the update frequency expressed by the update frequency information to the first time stored in the update time storage,
wherein the first encrypted data is obtained by the total consumption detecting device by totalizing a plurality of second encrypted data calculated by a plurality of measuring devices included in the targeted management region wherein the total consumption detecting device does not have access to the decryption key and the totalizing of the plurality of second encrypted data is performed without decrypting the plurality of second encrypted data, and
wherein the decryption key is generated by totalizing a plurality of first encryption keys used for encrypting the consumption.

8. A consumption calculating system, comprising:
a plurality of measuring devices to belong to a predetermined targeted management region, each of the measuring devices transmitting first encrypted data obtained by encrypting a consumption of a target;
a total consumption detecting device to detect second encrypted data obtained by totalizing first encrypted data items about consumptions measured by the measuring devices in the targeted management region, the encrypted data items being totalized without being decrypted;
an information processor to decrypt the second encrypted data to control use of the target measured by the measuring devices in the targeted management region; and
a key management device to share a secret key with each of the measuring devices and update a decryption key to be provided to the information processor,
wherein each of the measuring devices comprises:
a consumption measurer to measure the consumption of the target at a predetermined time interval within a predetermined measurement area in the targeted management region;
a consumption storage to store the measured consumption;
a first update time storage to store a first time updated at a first constant frequency;
a first secret key storage to store the secret key shared with the key management device;
an encryption key updater to update an encryption key at a first time period based on the secret key and the first time;
an encryption key storage to store the encryption key;
an encryptor to generate encrypted data by encrypting the consumption using the encryption key stored in the encryption key storage and a second time associated with the consumption; and
an encrypted data storage to store the generated encrypted data, the information processor comprises:
a regional encrypted data storage to store the second encrypted data transmitted from the total consumption detecting device;
a decryption key storage to store the decryption key updated by the key management device at a second time period;
a decryptor to acquire the total consumption by decrypting the second encrypted data using time information included in the second encrypted data and the decryption key stored in the decryption key storage; and
a regional consumption controller to control the consumption of the target in the targeted management region, based on the total consumption acquired by the decryptor, and
the key management device comprises:
a second secret key storage to store a plurality of secret keys shared with the plurality of measuring devices;
a second update time storage to store a third update time of the decryption key updated at a second constant frequency; and
a decryption key updater to update the decryption key using the plurality of secret keys shared with the plurality of measuring devices included in the predetermined targeted management region and the third time stored in the second update time storage,
wherein the decryption key is generated by totalizing the plurality of first encrypted keys used for encryption of the consumption.

9. The consumption calculating system of claim 8, wherein the target is at least one of electricity, gas, and water.

* * * * *